July 28, 1959     L. DE WITT, JR     2,896,370
AIRFOIL FOR TOY AIRCRAFT

Filed Sept. 5, 1956     2 Sheets-Sheet 1

INVENTOR.
LESLIE DeWITT Jr.

BY
*John H. Widdowson*
ATTORNEY

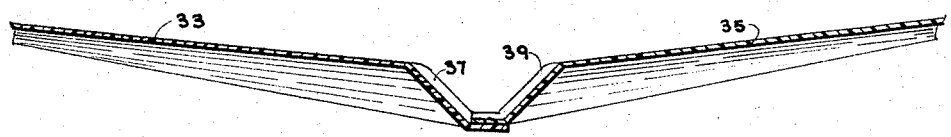
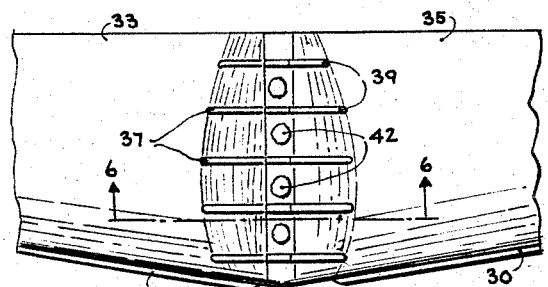
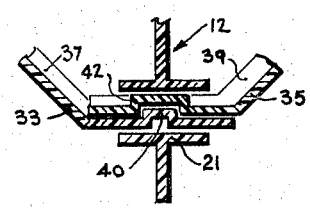
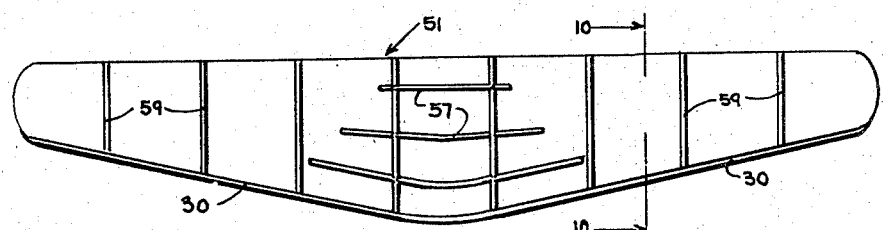
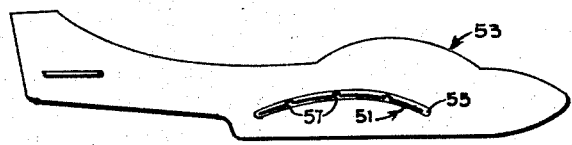
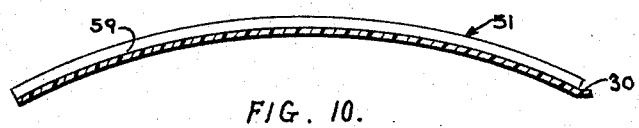
INVENTOR.
LESLIE DeWITT Jr.
BY
ATTORNEY United States Patent Office 2,896,370
Patented July 28, 1959

2,896,370

AIRFOIL FOR TOY AIRCRAFT

Leslie De Witt, Jr., Wichita, Kans.

Application September 5, 1956, Serial No. 608,037

3 Claims. (Cl. 46—79)

This invention relates to aircraft. In a more specific aspect this invention relates to airfoil structure, particularly wing structure, for aircraft. In a still more specific aspect this invention relates to a formed plastic, single-surface wing for mounting in a slot in the fuselage member of a toy glider.

Toy aircraft such as gliders and airplanes powered by rubber motors or small gasoline engines have long been known in the art. These known aircraft and the airfoils therefor such as the wings have usually been made of balsa wood or other light, soft and fibrous wood, and it is known to make single surface balsa wood wings and stabilizers. Also, it is known to make double surface wings and stabilizers using a thin plastic cover over a frame work. However, no way or means has been known in the prior art to make a single surface plastic airfoil wing for a glider. Problems of weight and rigidity have given much trouble. I have discovered a new structural means for an aircraft airfoil which is particularly usable to form a single surface wing. The new wing of my invention is light of structure and relatively rigid, and is preferably formed from a sheet of thin thermoplastic material.

The new transverse airfoil structure of my invention for mounting on the fuselage of a toy aircraft to form the new aircraft of my invention has an elongated thin member which is curved in transverse cross-section in the outer portions to have a convex upper surface. This elongated member which can be in one-piece or in several sections has strengthening spars in the central portion, and the central portion is adapted to receive the fuselage of the aircraft. The spars and curved structure have been found by me to make it possible to form a thin wing with a single surface out of plastic, and to result in a light, rigid and strong wing. The new structure of my invention has been found to be of particular value for use as the wing on a plastic toy glider fitting on the fuselage through a slot therein. I prefer that the wing structure have a plurality of spaced transverse strengthening rib members, and a strengthening lip along the leading edge of the wing. My most preferred wing structure is formed from a thin sheet of plastic with the spars, ribs and lip integral therewith. The new wing structure of my invention readily lends itself to making a streamlined wing with convex upper surface that has a central portion with spars formed therein and a relatively flat and depressed portion for fuselage mounting or a compound curved wing can readily be constructed. Also, the new wing structure of my invention can be made in sections interlocked in the inner ends at the point of fuselage mounting.

It is an object of this invention to provide new aircraft means.

It is another object of this invention to provide new airfoil structure for aircraft, particularly new wing structure for toy gliders.

Still another object of this invention is to provide new wing structure for toy gliders, such wing structure lending itself to being formed in one piece from a thin sheet of thermosetting plastic material.

Drawings accompany and are a part of this disclosure. The drawings depict preferred specific embodiments of the new airfoil structure of my invention, and it is to be understood that such are not to unduly limit the scope of my invention. In the drawings.

Fig. 5 is a plan view of another preferred specific embodiment of a wing airfoil structure made according to my invention.

Fig. 6 is a view taken on line 6—6 of Fig. 5.

Fig. 7 is an enlarged view showing the preferred mounting of the wing of Figs. 5 and 6 in the fuselage.

Fig. 8 is a plan view of another preferred specific embodiment of wing structure made according to the means of my invention and being compoundedly curved.

Fig. 9 is a schematic drawing showing in side elevation a preferred manner of mounting the wing of Fig. 8 in the fuselage of a toy glider.

Fig. 10 is a view taken on line 10—10 of Fig. 8.

Figure 1:
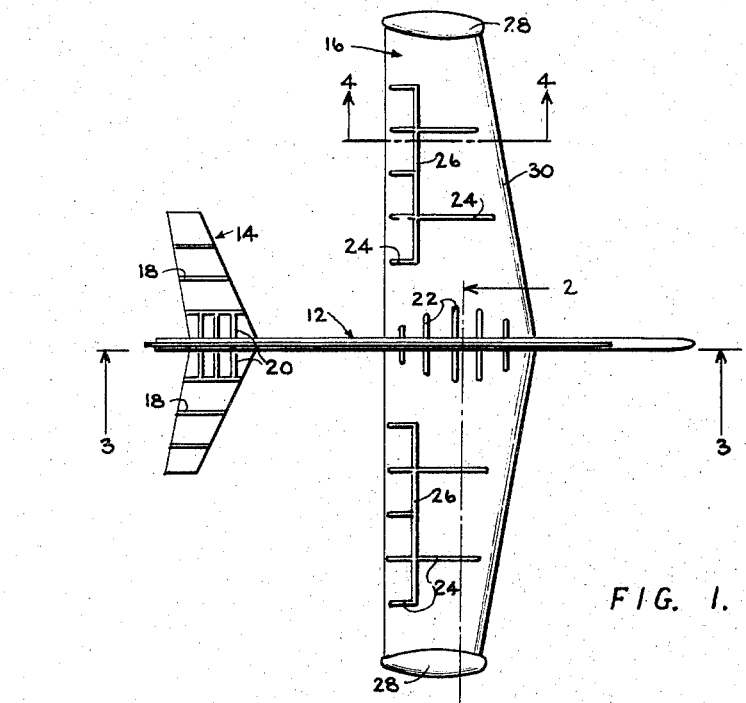
Fig. 1 is a top plan view of a preferred specific embodiment of a toy glider of my invention incorporating a preferred specific embodiment of the new wing structure of my invention.

Following is a discussion and description of the new airfoil structure of my invention made with reference to the drawings whereon the same reference numerals are used to indicate the same or similar parts or structure. The discussion and description is of preferred specific embodiments of my invention, and it is to be understood that such is not to unduly limit the scope of my invention.

In Figs. 1 through 4 a plastic glider made according to my invention is depicted. It has a fuselage 12, a tail stabilizer 14, and a one-piece, single surface wing 16. The tail member 14 is preferably a substantially flat and single surface, and is formed from plastic sheet in much the same manner as wing 16, as will be set forth hereinafter. The tail preferably has strengthening ribs 18 and strengthening spars 20 formed integral therewith to make same relatively rigid and so that the shape will be maintained in flight. Fuselage 12 is preferably molded from plastic material in the known and usual manner. It is preferably formed with a longitudinal slot 21 fore and aft to receive wing 16 and stabilizer 14, respectively. Slot 21 is preferably made longer than the width of wing 16 at point of contact so that the wing can be moved back and forth to trim the glider.

Figure 2:
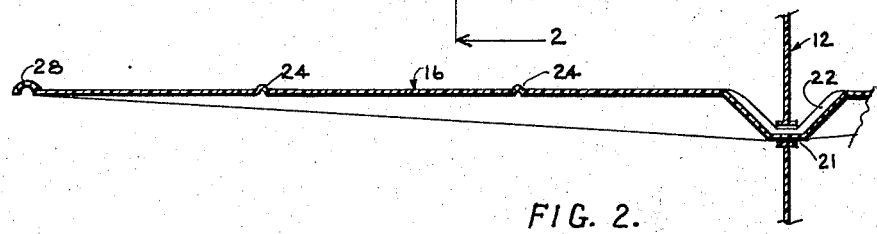
Fig. 2 is an enlarged cross-sectional view taken on line 2—2 of Fig. 1.
Figure 3:
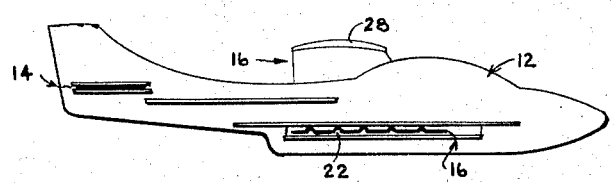
Fig. 3 is a view taken on line 3—3 of Fig. 1.
Figure 4:
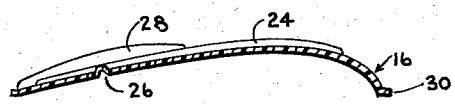
Fig. 4 is a view taken on line 4—4 of Fig. 1.

My invention is primarily concerned with the new structure of single surface wing 16 and the aircraft resulting therefrom. The new wing airfoil structure of my invention is preferably formed from a thin sheet of plastic material by the known vacuum forming methods using a mold with provision for heating to set-up the plastic material. It can conveniently be made from relatively thin sheet metal by stamping operations, preferably light weight metals such as aluminum, magnesium, their alloys, and the like. In producing my new wing structure the vacuum mold is made with raised portions on the face so that spars 22 through the central portion of the wing are integrally formed therein. Likewise, ribs 24 in the outer portions of the wing 16, spars 26 outlining and simulating ailerons, and wing fuel tanks 28 are integrally formed with the wing 16 by providing raised portions therefor on the face of the vacuum mold. These spars, ribs and simulated tanks 28 have been found by me to make an otherwise flimsy, thin sheet of plastic relatively resistant to bending, and so that the wing made thereform will maintain its shape in flight. I have found it desirable to make the vacuum mold so that when the formed wing structure is trimmed around the edge, a strengthening lip 30 along the leading edge will project forward from the wing member. A similar lip (not shown) along the trailing edge of the wing can be used, if desired. As shown in Fig. 2, the wing is preferably depressed and flattened through the center portion so that it will fit into horizontal, straight slot 21 with strengthening spars 22 acting to snugly maintain the wing in the slot. I prefer that wing 16 have an upper convex surface as shown, and the degree of curvature can be varied as desired in conformance with good flight principles.

Figs. 5, 6 and 7 depict another preferred specific embodiment of the new single surface wing structure of my invention wherein the wing is in two sections 33 and 35 which are joined in the inner ends in slot 21 of fuselage 12 when mounted therein. Sections 33 and 35 have spars 37 and 39, respectively, preferably formed integral therewith and positioned to correspond when 33 and 35 are mounted together. A forward edge lip 30 can be provided, and is desirable from the standpoint of strengthening the wing. Also, the center portion is recessed and relatively flat so that the wing can be mounted in a horizontal slot 21 with spars 37 and 39 snugly holding the wing in the slot. Wing section 33 has a plurality of raised portions 40 between the spars 39 thereof which correspond to and fit into dimples 42 in section 35. When the raised portions 40 and dimples 42 are in engagement in slot 21, the wing sections are locked together in place and against twisting out of alignment with each other. The two-piece structure of Figs. 5, 6 and 7 has been found very advantageous, since the glider is of more of a knock down structure than with the one-piece wing. As in the case of the wing of Figs. 1-4, this wing is preferably convex on the upper surface in the outer portions, and the curvature can be varied as desired.

Figs. 8, 9 and 10 depict another preferred specific embodiment of the new single surface wing structure of my invention wherein a compound curved wing 51 in one-piece is mounted in fuselage 53 in a curved slot 55 therein. This wing is preferably made with center spars 57 integral therewith, and transverse ribs 59 integral therewith. Also, an integral strengthening lip 30 can be incorporated in the wing, if desired. Wing 51 has a convex upper surface substantially throughout the entire length of the wing and the curved slot 55 is shaped to fit the center of the wing, the spars 57 snugly holding the wing in the slot. This curved mounting of the compound curved wing has its advantages over the other wing embodiments of my invention. The wing can be slid forward to decrease the angle of attack and slid back for greater angle of attack to trim the glide of the glider.

All of the embodiments of the new wing structure of my invention can conveniently be made by the common vacuum mold method of forming articles from uncured plastic sheet. I prefer to make the airfoil structures from plastic in sheet form such as vinyl polymers and copolymers, cellulose acetate resins, polystyrene resins, and particularly preferred is polystyrene sheet which has been extended and stretched to three times its size. This polystyrene sheet is oftentimes referred to as "oriented" plastic, and can be made into a very thin sheet. I have found it advisable to carefully heat this sheet during curing, since the cure is sensitive. Polystyrene sheet of medium or high impact strength is most desirable. While the wing structure is most desirably formed of plastic, it can conveniently be made from thin sheets of light metals, preferably aluminum, magnesium, their alloys, and the like.

As will be evident to those skilled in the art, various modifications of this invention can be made, or followed, in view of this disclosure and discussion, without departing from the spirit or scope of the disclosure or from the scope of the claims.

I claim:

1. A wing structure for mounting on the fuselage of a toy glider, comprising, in combination, an elongated, thin and sheet-like, formed plastic member being substantially straight in longitudinal cross-section in its outer portions and curved in transverse cross-section in said outer portions to have a streamlined convex upper surface, said plastic member being in two sections joinable in the inner end portions of said sections to oppositely dispose said sections on each side of said fuselage when said wing is mounted in said fuselage, one of said inner end portions of said sections having a plurality of transversely spaced dimples and the other of said inner end portions of said sections having a plurality of transversely spaced raised portions corresponding to said dimples, and said sections adapted and constructed to interlock in said fuselage with said raised portions mounted in said dimples, said outer portions of said wing forming a dihedral angle and being compoundly curved, the central portion of said wing having a plurality of longitudinal, spaced strengthening spars formed integral therewith and constructed and adapted to be received by said fuselage to mount said wing thereon, and said wing having a plurality of spaced, transverse strengthening ribs formed integral therewith in said outer portions and a strengthening lip formed integrally therewith along the leading edge of said wing.

2. A wing structure for mounting in a slot in the fuselage of a toy glider, comprising, in combination, an elongated, thin and sheet-like one-piece, formed plastic member being substantially straight in longitudinal cross-section in its outer portions and curved in transverse cross-section in said outer portions to have a streamlined convex upper surface, the central portion of said wing having a plurality of spaced, longitudinal and raised strengthening and stiffening spars formed integral therewith and a relatively flat and depressed transverse portion, and constructed and adapted to fit into said slot of said fuselage to mount said wing therewith, said spars being constructed to snugly and frictionally engage said fuselage to secure said wing structure when mounted in said fuselage, said wing having longitudinal strengthening spars formed integral therewith in said outer portions, a plurality of spaced, transverse strengthening ribs formed integral therewith in said outer portions, and a forwardly projecting strengthening lip formed integral therewith along the leading edge, said outer portions of said wing forming a dihedral angle and being compoundly curved, and said wing having elongated convex raised portions on its outer ends formed integral therewith and transverse thereto to simulate wing fuel tanks and to strengthen said wing.

3. Airfoil structure and mounting means therefor for a toy glider comprising, in combination, a fuselage having a slot therein, a wing structure comprising an elongated, thin and sheet-like one-piece formed plastic member being substantially straight in longitudinal cross-section in its outer portions and curved in transverse cross-section in said outer portions to have a streamlined convex upper surface, the central portion of said wing structure having a plurality of spaced, longitudinal and raised strengthening and stiffening spars formed integral therewith, said wing structure mounted in said fuselage in said slot therein with said spars snugly and frictionally engaging said fuselage to secure said wing structure in said fuselage, said wing structure in said outer portions having longitudinal and transverse strengthening and stiffening portions formed integral therewith, including a forwardly projecting strengthening lip formed integral therewith along the leading edge, and said outer portions of said wing forming a dihedral angle and being compoundly curved.

References Cited in the file of this patent

UNITED STATES PATENTS

| | | |
|---|---|---|
| 1,497,774 | Dowd | June 17, 1924 |
| 1,792,779 | Tarr | Feb. 17, 1931 |
| 2,031,419 | Kramer | Feb. 18, 1936 |
| 2,593,979 | Calhoun | Apr. 22, 1952 |
| 2,632,282 | Johnson | Mar. 24, 1953 |
| 2,724,211 | Bloom | Nov. 22, 1955 |